United States Patent [19]

Dickinson et al.

[11] Patent Number: 5,408,155
[45] Date of Patent: Apr. 18, 1995

[54] BEARING ASSEMBLY FOR AN INTEGRAL MOTOR/PROPELLER UNIT

[75] Inventors: Robert J. Dickinson, Shaler Township, Allegheny County; Stanley Necheff, East Deer Township, Allegheny County; Albert A. Raimondi, Turtle Creek, all of Pa.

[73] Assignee: Westinghouse Electric Corporation, Pittsburgh, Pa.

[21] Appl. No.: 131,942

[22] Filed: Oct. 8, 1993

[51] Int. Cl.[6] .......................... H02K 7/08; H02K 5/12; H02K 7/14; F16C 27/06
[52] U.S. Cl. ..................................... 310/90; 310/87; 310/67 R; 384/215
[58] Field of Search ................... 310/63, 67 R, 87, 89, 310/90; 384/97, 215, 220, 222, 223, 907, 913; 417/355, 356, 423 B; 440/6, 38

[56] References Cited

U.S. PATENT DOCUMENTS

| | | | |
|---|---|---|---|
| 2,008,527 | 7/1935 | Warren | 384/315 |
| 3,495,537 | 2/1970 | Archibald | 417/372 |
| 3,914,629 | 10/1975 | Gardiner | 310/87 |
| 4,042,847 | 4/1977 | Jensen | 310/87 |
| 4,087,137 | 5/1978 | Voitas | 384/278 |
| 4,332,524 | 6/1982 | Smith | 415/176 |
| 4,664,595 | 5/1987 | Tsuji et al. | 384/222 |
| 4,831,297 | 5/1989 | Taylor et al. | 310/87 |
| 5,035,519 | 7/1991 | Aizawa et al. | 384/121 |
| 5,101,128 | 3/1992 | Veronesi et al. | 440/6 |
| 5,143,457 | 9/1992 | Langhof et al. | 384/215 |
| 5,158,545 | 2/1993 | Veronesi et al. | 310/114 |
| 5,220,231 | 6/1993 | Veronesi et al. | 384/97 |
| 5,252,875 | 10/1993 | Veronesi et al. | 310/114 |

FOREIGN PATENT DOCUMENTS 4-60212 2/1992 Japan ................... 384/222

*Primary Examiner*—Steven L. Stephan
*Assistant Examiner*—Clayton E. LaBalle

[57] ABSTRACT

A bearing assembly for a submersible motor/propeller unit for a water vehicle consists of a radial bearing assembly and a thrust bearing assembly associated with a propeller and an axle. The radial and thrust bearing assemblies are comprised of bearing components, preferably made of a hard material to provide "hard-on-hard" bearing surfaces, and a resilient backing means, preferably rubber, positioned behind the stationary bearing component. The "hard-on-hard" bearing surfaces increase the load capacity and operating life of the bearings, and the resilient backing means allows the propeller to be displaced under high impact shock loads and to transfer the shock loads to shock snubber locations between the rotor and the stator. The combination of "hard-on-hard" bearings with the resilient backing means provides control of the centering of the propeller on the shaft and longer operating life for the propeller unit, as well as increased capability to survive high shock loads.

10 Claims, 7 Drawing Sheets

BEARING ASSEMBLY FOR AN INTEGRAL MOTOR/PROPELLER UNIT

BACKGROUND OF THE INVENTION

1. Field of the Invention

This invention relates to submersible motors and is specifically concerned with an improving bearing assembly for an integral motor/propeller unit for water vehicles that provides an improved centering of the rotating assembly and an increase in the operating life of the bearing while enhancing the capability of the bearing assembly to survive shock loads.

2. Description of Prior Art

Integral motor/profiler units are known in the prior art. Such units are used either as surface vessels or for submersible vessels. Examples of integral motor/propeller units as a secondary drive unit for a submarine are disclosed U.S. Pat. No. 4,831,297 and in patent application U.S. Ser. No. 571,970 filed on Aug. 23, 1990, both developed owned by Westinghouse Electric Corporation. Generally, the bearings of these secondary drive units are lubricated by sea water which contains silt, and, shell particles, and other contaminants. The advanced design of the prior art of U.S. Pat. No. 4,831,297 involves a shroud having a water inlet and a water outlet. This unit is design to increase the thrust output for a given weight and size, while at the same time reducing the amount of cavitation generated due to the large unencumbered flow of water that the propeller of the device forces through the fluid-dynamically shaped shroud. Even though the integral motor/propeller unit of U.S. Pat. No. 4,831,297 represents a substantial advance in the art, several features of this design were improved upon by the unit disclosed in the aforesaid application bearing U.S. Ser. No. 571,970, in that this design provides a unit with more easy access to the bearings for their inspection and replacement.

The design of U.S. Ser. No. 571,970 has a bearing assembly which includes a thrust bearing and a radial bearing located between the hub of the propeller and the shaft, and includes an impeller mechanism which circulates the flow of lubricating and cooling water between the surfaces of the bearings.

In the integral motor/propeller units discussed hereinabove, the thrust and the radial bearings may have wear surfaces where one of the surfaces is either rubber or a phenolic material and the other bearing surface is metal. This type of bearing with the "soft-on-hard" bearing surfaces does not adequately control the centering of the rotating assembly in the stationary assembly as is required for submersible motor/propeller units because of the "soft" nature of the one beating surface. These types of bearings are also known as having a short operating life in view of the excessive wear of the soft material in the presence of the contaminants common in sea water.

This type of beating can only be used for applications with relatively low unit loads and is prone to failure if there is a loss of the lubricating fluid film on a decrease in the cooling water flow through the bearing assembly. The bearing assembly with "soft-on-hard" bearing surfaces can withstand relatively high levels of shock loading without sustaining any significant damage to the beating surfaces themselves, but, tends to permit large deflections of the rotating assembly during shock loading events that can make the rotating assembly prone to unacceptable levels of damage.

Previously, Westinghouse Electric Corporation had employed thrust and radial bearings for a bearing assembly of a submersible motor for a submersible vessel which had beating surfaces made of a relatively hard metal, for both beating surfaces, commonly referred to as "hard-on-hard" surfaces, as opposed to the beating surfaces being rubber or phenolic material contacting metal material, as discussed in the above examples of the prior art.

This type of bearing design with the "hard-on-hard" beating surfaces does provide better control of the centering of the rotating assembly and does increase the bearing operating life, but is not capable of withstanding high impact shock loads without significant damage that can render the rotating assembly inoperable.

SUMMARY OF THE INVENTION

The invention is a seawater lubricated bearing assembly that obviates or at least ameliorates the aforementioned shortcomings associated with the prior art by providing a unique design for the beating assembly for a motor for a water vehicle which provides a control for the centering of a rotating assembly and an increased operating life while at the same time increasing the capability of the beating assembly to withstand high impact shock loads.

The present invention provides a bearing assembly having a thrust bearing disposed between the propeller hub and the upstream end of the shaft, and a radial bearing disposed around the inner circumference of the propeller hub. The beating surfaces of the trust and radial beatings are "hard-on-hard" bearing surfaces with a resilient backing means which is disposed behind at least one of the bearing components in order to provide a controlled stiffness for the radial and thrust bearings. The "hard-on-hard" beating surfaces are preferably harder than silica sand which is the hardest type of contaminant that is likely to be encountered in the seawater lubricating fluid. Examples of the kinds of material used for the "hard-on-hard" bearing wear surfaces of the invention are monolithic tungsten carbide or ceramic coatings deposits on a hard substrate, such as K-MONEL ®, a nickel, copper, and aluminum material.

The resilient backing means may preferably be made of rubber, and the controlled stiffness is based on the dimensions of the rubber backing element. Preferably, the resilient backing means is associated with the stationary bearing element. The outer ring of the rotating assembly is positioned within an inner ring of the stationary assembly and a gap is created therebetween. In order to prevent sea debris from entering this gap, walls between the stationary and the rotating assemblies are crenelated which define a torturous path therebetween. The clearances between these crenelated portions are preferably less than that of the gap between the stationary and rotating assemblies.

The capability of the "hard-on-hard" beating surface materials to withstand high impact shock loads is achieved by carefully designing the stiffness of the resilient backing means associated with the stationary bearing element. The stiffness of the resilient backing means must be high enough to maintain the positioning of the rotating assembly under the "normal" operating loads, but complaint enough to allow the bearing assembly to displace under high impact shock loadings and to transfer most of the high impact loads to shock snubber surfaces, which are the crenelated portions of the stationary and rotating assemblies of the motor/propeller unit.

The bearing components of the invention are preferably made out of tungsten carbide or a monolithic tungsten carbide containing a nickel binder.

It is therefore an object of the present invention to provide a bearing assembly for a submersible motor/propeller unit having a greater control of the centering of the rotating assembly, a greater load capacity, and a longer operating life than previous bearing assemblies, while maintaining the capability to withstand high impact shock loads and reducing the tendency of failure due to loss of the lubricating film.

It is a further object of the present invention to provide a bearing assembly for a submersible motor/propeller unit which has "hard-on-hard" bearing surfaces combined with a resilient backing element which provides enough stiffness to maintain the position of the rotating assembly on a propeller shaft under normal bearing operating loads but compliant enough to allow the bearings to displace under the high impact shock loads, thereby transferring the majority of the shock loads to shock snubber locations at the crenelated portions of the stator and the rotor of the unit.

It is another object of the present invention to provide a beating assembly for an integral motor/propeller unit employing hard-on-hard beating surfaces which is more resistant to external shocks, and which maintains a clearance between the beating surfaces and to allow for the lubricating film to remain in those clearances regardless of the axial or radial movement of the rotor assembly on the propeller shaft between the rotating and the stationary assemblies or between the rotor and the stator.

It is a further object of the present invention to provide a bearing assembly with cooperative beating members having hard metal beating surfaces and a resilient backing element associated with at least one of the bearing members.

These and other objects of the present invention will be more fully understood from the following description of the invention on reference to the illustrations appended herein.

DESCRIPTION OF THE PREFERRED EMBODIMENT

The invention has particular application for use in an integral motor/propeller unit for a water vehicle, such as a submarine, where the sea water containing silt, sand and other contaminant particles lubricates the bearing system for the rotor which rotates within the stator. The invention is an improvement to the bearing assembly of a motor/propeller unit which is similar to that disclosed in the aforementioned patent application bearing U.S. Ser. No. 571,970, filed on Aug. 23, 1990, which is incorporated herein by reference.

Figure 1:
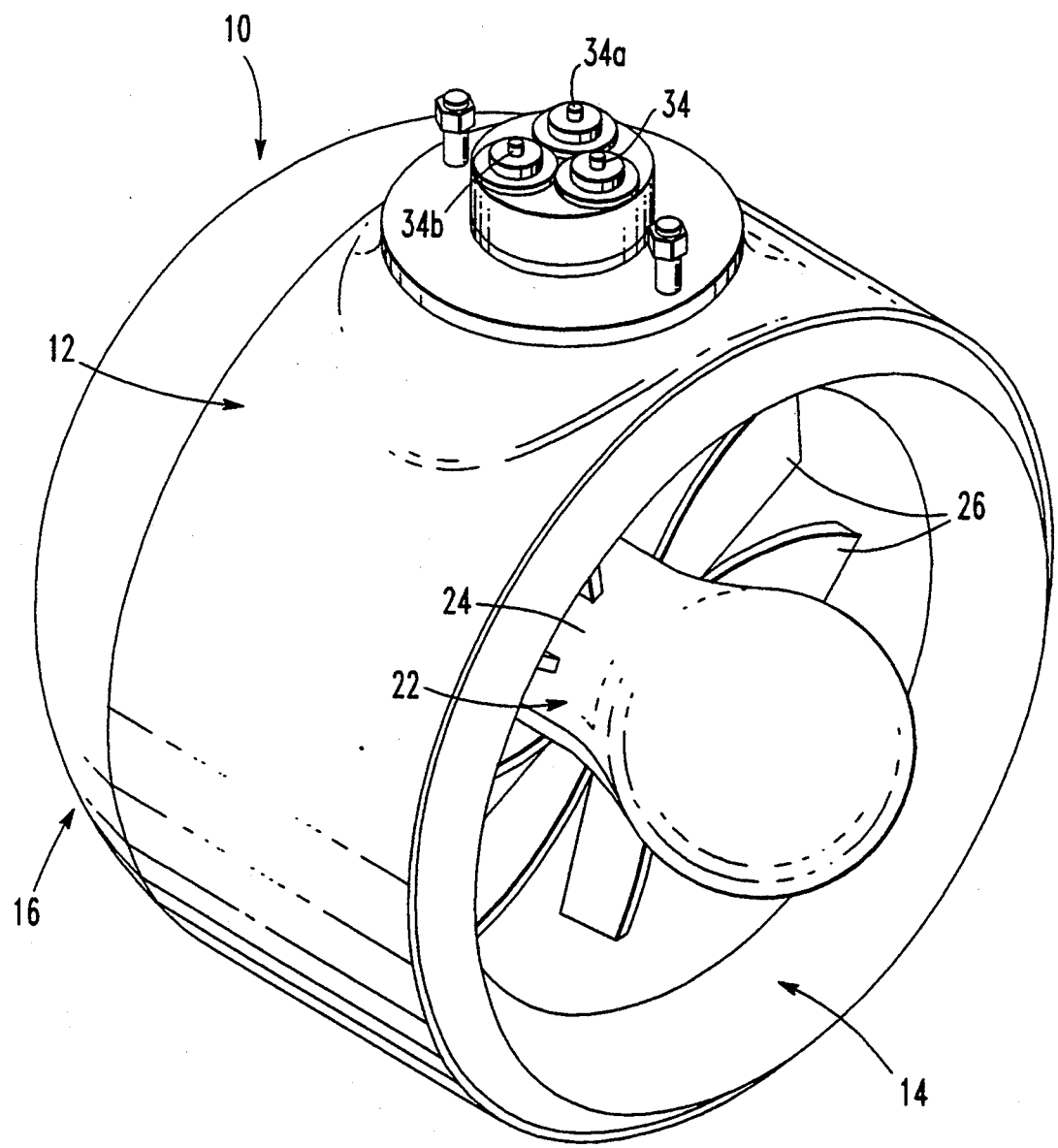
FIG. 1 is a perspective view of an integral motor/propeller unit which entails the present invention.
Figure 2:
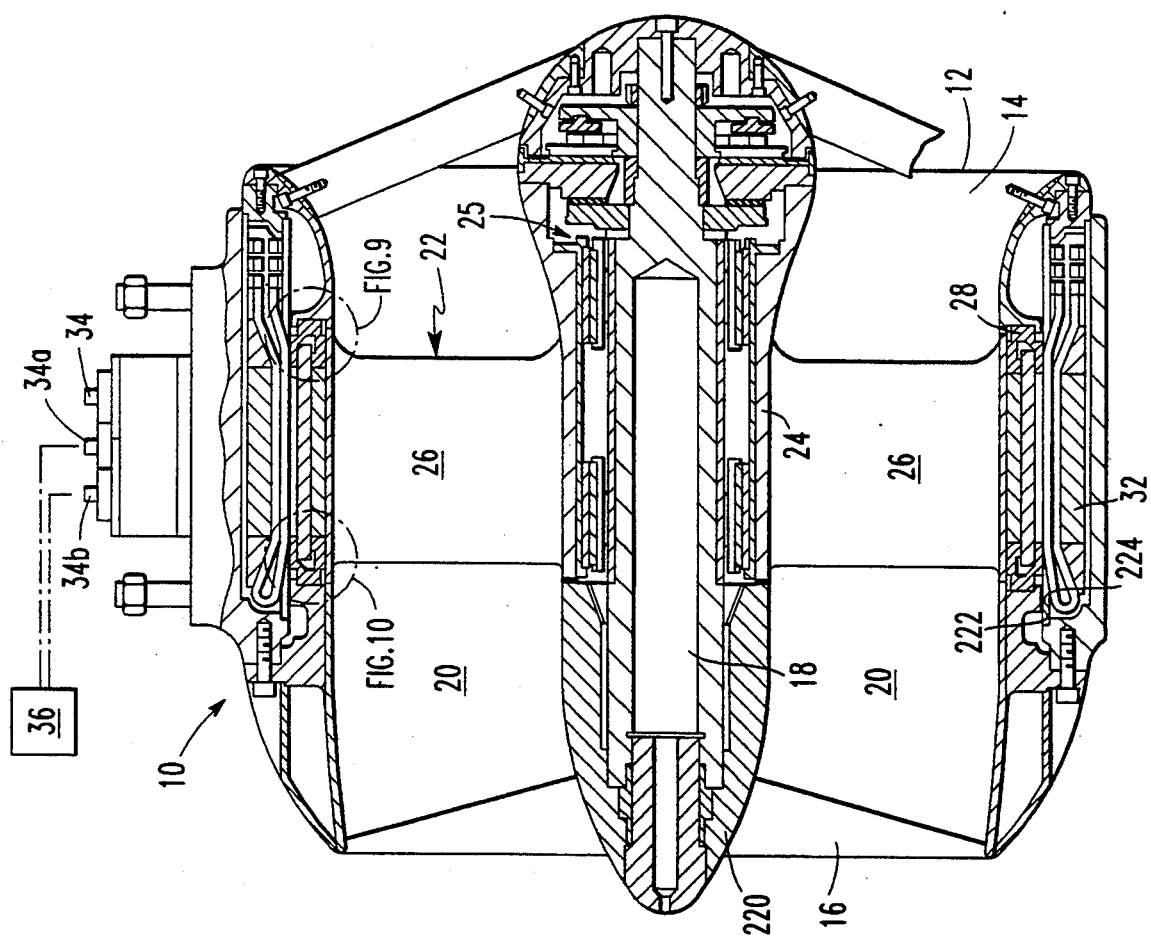
FIG. 2 is a cross-sectional side view of the propeller unit of FIG. 1.
Figure 3:
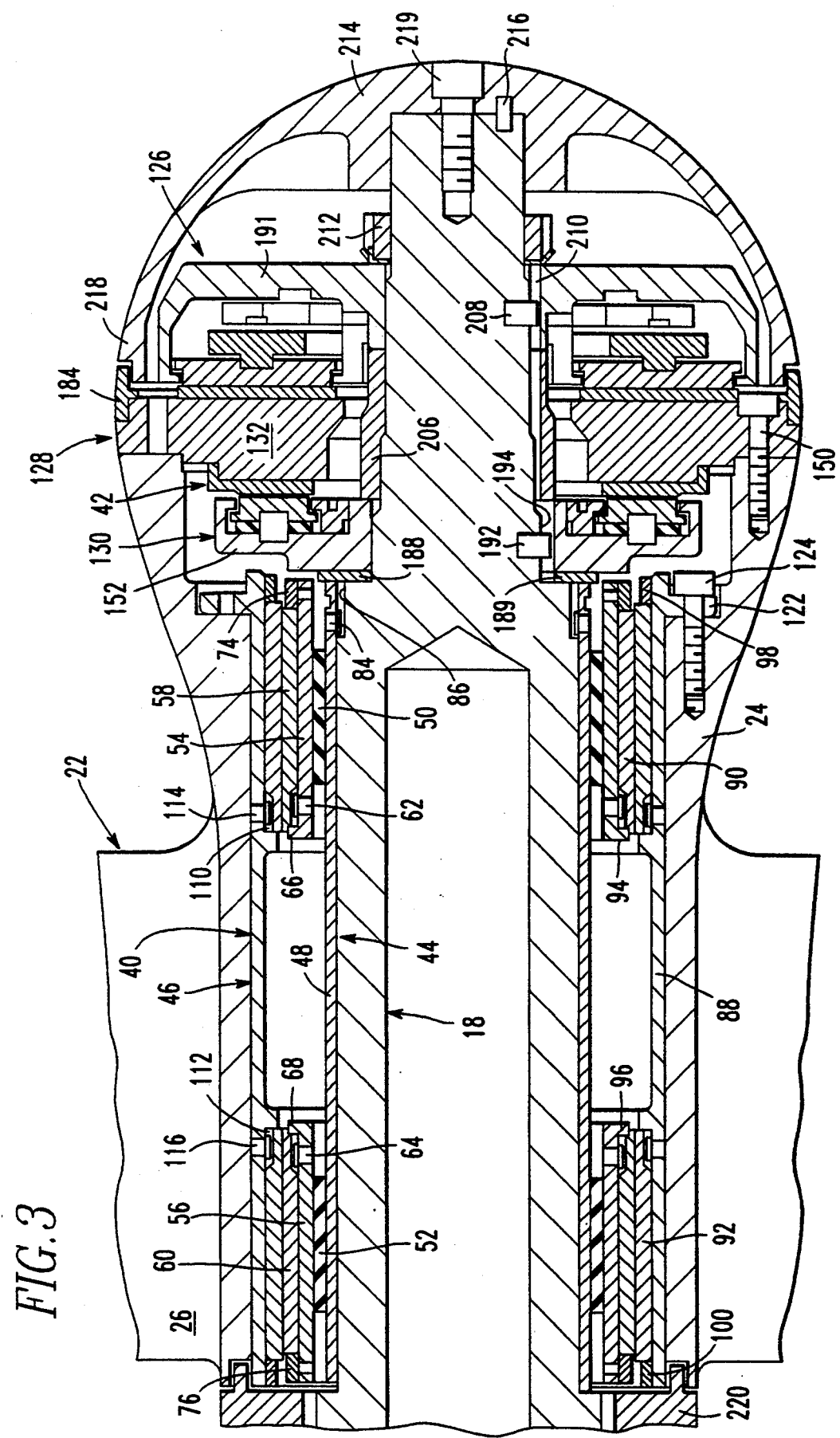
FIG. 3 is a partially enlarged, cross-sectional view of the propeller unit of FIG. 2 illustrating the various components of the beating assembly of the present invention disposed between the axle of the unit and the hub of the propeller.

With reference particularly to FIGS. 1, 2, and 3, where like reference numerals designate like components throughout the several figures, a motor/propeller unit 10 of the invention generally comprises a nozzle assembly 12 having a water inlet 14 and a water outlet 16. A stationary shaft or axle 18 is mounted along the axis of rotation of the interior of the nozzle assembly 12 by a plurality of vane members 20. A propeller 22 is disposed within the interior of the nozzle assembly 12 and includes a hub 24 at its center which is rotatably mounted onto the stationary axle 18. The propeller 22 further includes a plurality of canted blades 26 whose inner ends are equidistantly mounted around hub 24, and whose other ends are connected to a rotor 28 of an electric motor that is an integral part of the central portion of nozzle assembly 12. The electric motor further includes a stator 32 disposed around the rotor 28 in a closely-spaced relationship. Stator terminal post assemblies 34, 34a and 34b are provided at the top end of propulsor unit 10 for connecting stator 32 of unit 10 to a power source 36 which may be a variable frequency cyclo-converter.

With reference particularly to FIG. 3, hub 24 is mounted onto stationary axle 18 by means of a radial bearing assembly 40 and a thrust bearing assembly 42 which minimizes friction between the propeller 22 and the shaft 18 circumferentially and axially.

The radial bearing assembly 40 consists of a journal cartridge 44 fixedly secured to axle 18 and a bearing cartridge 46 fixedly secured to hub 24. Journal cartridge 44 consists of a main journal sleeve 48. Mounted on opposite ends of main journal sleeve 48 are inner sleeves 50 and 52 made of a resilient material, intermediate sleeves 54 and 56 and outer bearing sleeves 58 and 60 made of a hard metal material, preferably tungsten carbide.

The inner wall of inner sleeves 50 and 52 is bonded to main journal sleeve 48 and the outer wall of inner sleeves 50 and 52 is bonded to intermediate sleeve 54 and 56, respectively. Preferably, the resilient material is molded directly to the inner sleeve 48 and the intermediate sleeves 54 and 56. The type of resilient material for inner sleeves 50 and 52 is preferably a seawater compatible rubber, such as neoprene but may be nitrile. Intermediate sleeves 54 and 56 have a guide pin 62, 64 and an inward circumferential ledge 66, 68. When outer beating sleeve 58, 60 is placed on its respective intermediate sleeve 54, 56, it abuts its respective ledge 66, 68, and a cutout not numbered but shown in FIG. 3, in the undersurface of beating sleeve 58, 60 receives its respective guide pin 62, 64. Guide pin 62, 64 prevents beating sleeve 58, 60 respectively from rotating. Ledge 66, 68 retains and prevents outer bearing sleeve 58, 60 from moving axially with respect to journal cartridge 44 in one direction, and a retaining ring 74, 76 mounted around and onto intermediate sleeve 54, 56, respectively, prevents outer bearing sleeve 58, 60 from moving axially in the other direction along journal cartridge 44. Retainer ring 74, 76 is secured to intermediate sleeve 54, 56 respectively by lock pins, not shown. Preferably, the outer beating sleeves 58 and 60 and their contact bearing surface is made of monolithic tungsten carbide, but the bearing sleeves may be made of K-Monel ®, a nickel, copper, and aluminum material parts with the bearing surface made of a ceramic coating such as chromium oxide which is thermally sprayed onto the K-Monel ®, a nickel, copper, and aluminum material parts.

Main journal sleeve 48 of journal cartridge 44 has a staged fit which facilitates the assembly and removal of journal cartridge 44 from stationary axle 18. As can be seen in FIG. 3, guide pins, one of which is indicated at 84, are located in main journal sleeve 48. Guide pin 84 fits into a cut-out section 86 around axle 18 to prevent rotation of main journal sleeve 48 relative to axle 18.

Still referring to FIG. 3, bearing cartridge 46 of radial bearing assembly 40 is disposed annularly around journal cartridge 44 on axle 18. This bearing cartridge 46 is comprised of a main sleeve 88 and outer radial bearing sleeves 90 and 92 which abut a ledge portion 94, 96, respectively of main sleeve 88 and which keeps radial beating sleeves 90 and 92 from moving axially along main sleeve 88 in one direction. A retainer ring 98, 100 disposed on the end of beating sleeves 90, 92 respectively opposite to that of ledge portion 94, 96 keeps radial bearing sleeves 90, 92 from moving axially along main sleeve 88 in another direction. Retainer ring 98, 100 is secured to main sleeve 88 by a lock pin not shown.

Each bearing sleeve 90, 92 has a cutout portion 110, 112 shown in the top of FIG. 3 which receives a guide pin 114, 116 secured in main sleeve 88. Each guide pin 114, 116 prevents its respective bearing sleeve 90, 92 from rotating relative to main sleeve 88 of bearing cartridge 46.

Radial bearing sleeves 90 and 92 have beating surfaces which contact those of outer beating sleeves 58 and 60, respectively. Similar to outer bearing sleeves 58 and 60, radial beating sleeves 90 and 92 are made of a hard metal. This hard metal material, preferably, is monolithic tungsten carbide where the entire bearing sleeve 90, 92 is made of tungsten carbide. The hard metal beating surfaces of bearing sleeves 90 and 92 may be a coat of ceramic, such as chromium oxide, which is thermally sprayed on K-Monel ®, a nickel, copper, and aluminum material of which bearing sleeves 90 and 92 may be made.

Main sleeve 88 of the bearing cartridge 46 has a flange 122 shown to the right of FIG. 3, and is secured thereto by fastening flange 122 to propeller hub 24 by bolts, one of which is indicated at numeral 124 in FIG. 3.

Preferably, but not necessarily, main journal sleeve 48, inner sleeves 50 and 52, and intermediate sleeves 54 and 56 remain assembled as a unit, and bearing sleeves 58 and 60 are easily removed for replacement simply by unfastening retainer rings 74 and 76. Similarly, outer radial bearing sleeves 90 and 92 are easily removed and replaced by unfastening retainer rings 98 and 100.

From the foregoing, it is apparent that journal cartridge 44 of radial bearing assembly 40 is fixed to stationary axle 18 for nonrotation, whereas beating cartridge 46 of radial beating assembly 40 is fixed to propeller hub 24 for rotation therewith. Thrust bearing assembly 42 is shown to the right of FIG. 3. Thrust beating assembly 42 consists of three main parts which are a thrust beating 126, a thrust runner 128, and a thrust bumper 130. Thrust bearing 126 is affixed to stationary axle 18 by several pins, one of which is indicated at 127, and is associated with thrust runner assembly 128, which is affixed to propeller hub 24 for rotation therewith, and with, in turn, is associated with thrust bumper assembly 130, which is affixed to stationary axle 18. Thrust runner assembly 128 is located between fixed thrust bearing 126 and fixed thrust bumper assembly 130, and rotates therebetween.

Figure 4:
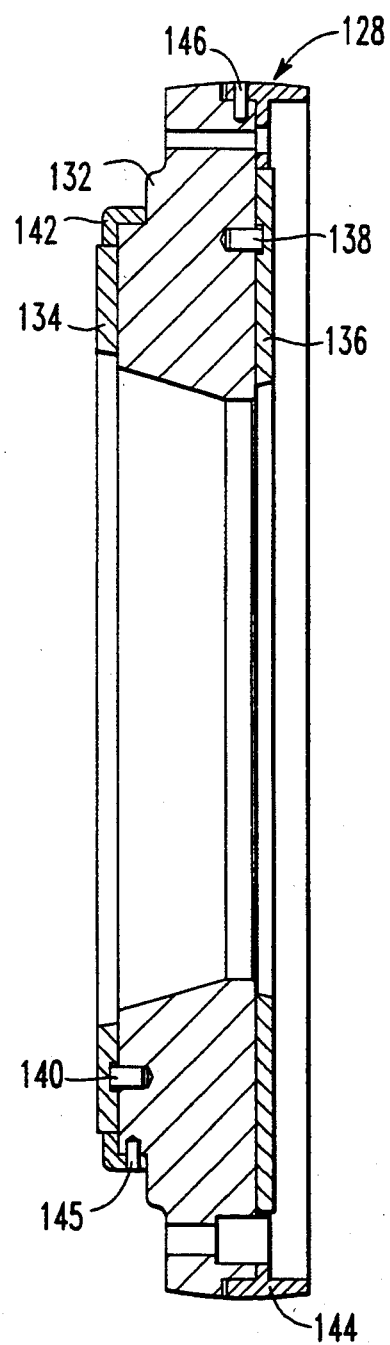
FIG. 4 is a fragmented cross-sectional view of the thrust runner of FIG. 3.

Referring particularly to FIG. 4, thrust runner 128 consists of an annular runner 132, an annular bumper plate 134 disposed on the one face of runner 132 to the left of FIG. 4, and an annular runner plate 136 disposed on the other face of runner 132 to the right of FIG. 4. Preferably, bumper plate 134 and runner plate 136 are made of tungsten carbide and are bonded to runner 132 by a suitable locking compound, such as MIL-S-22473. Anti-rotation pins indicated at 138 and 140 in FIG. 4 are provided in plates 134 and 136, respectively, for securing plates 134 and 136 to runner 132. Additionally, retaining ring 142 associated with bumper plate 134 and retaining ring 144 associated with runner plate 136 are provided. Retainer rings 142 and 144 are secured to runner 132 by lock pins, two of which are indicated at numeral 145 for retainer ring 142 for bumper plate 134 and numeral 146 for retainer ring 146 for runner plate 136.

Referring again to FIG. 3, thrust runner 128 of FIG. 4 is assembled and positioned in assembled form onto propeller hub 24 and is secured thereto by bolts, one of which is indicated by numeral 150 which extends through runner 132 and into propeller hub 24 as shown in the lower tight hand corner of FIG. 3.

Figure 5:
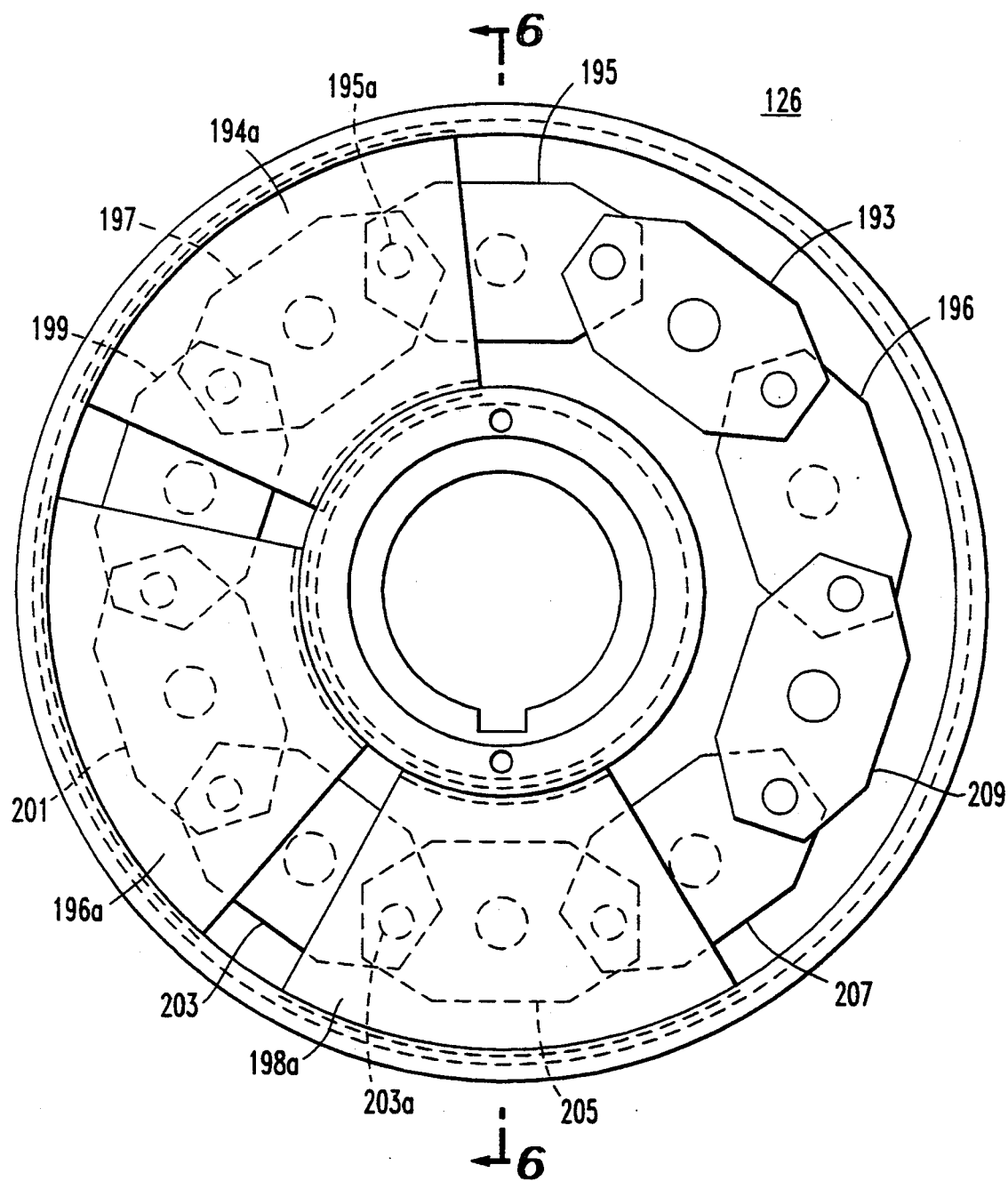
FIG. 5 is a full view showing some of the bearing shoes and the thrust bearing of FIG. 3.
Figure 6:
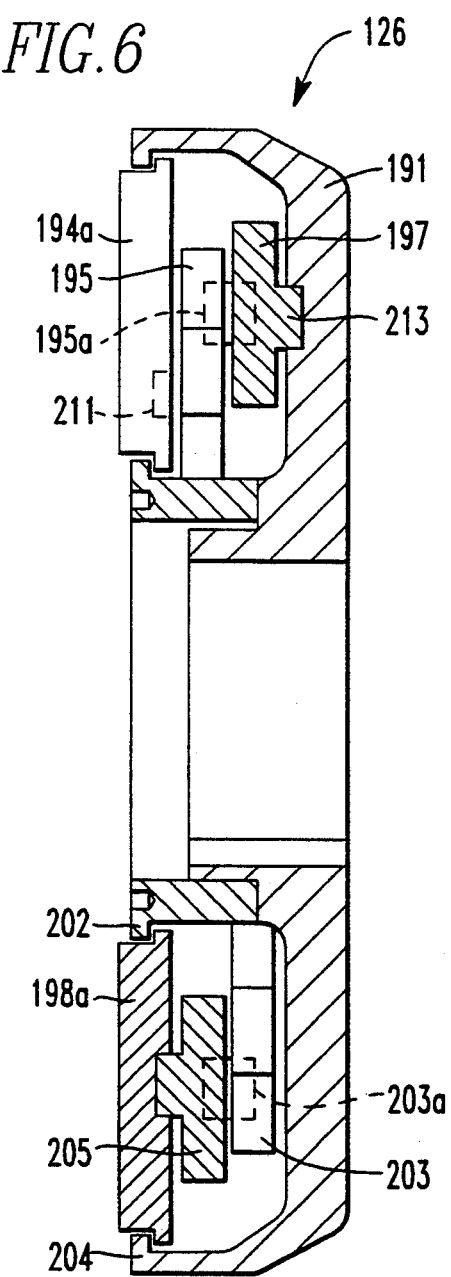
FIG. 6 is a fragmented cross-sectional view taken along lines 6—6 of the thrust bearing of FIG. 5.
Figure 8:
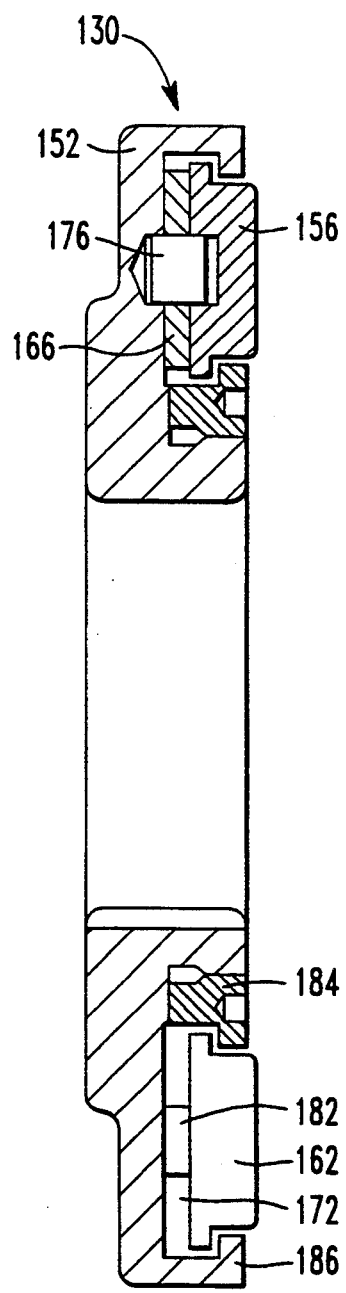
FIG. 8 is a fragmented cross-sectional view taken along lines 8—8 of the thrust bumper of FIG. 7.
Figure 7:
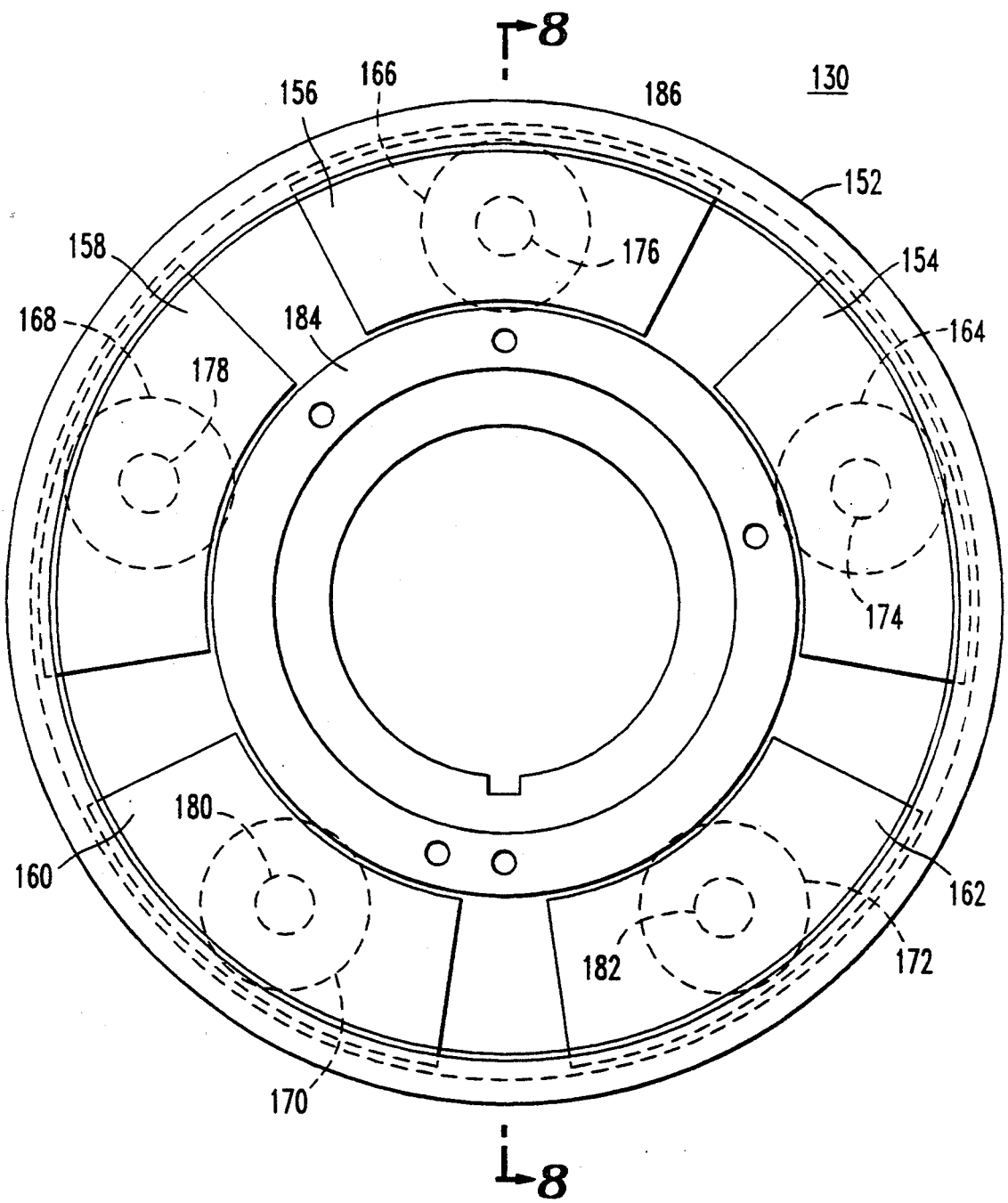
FIG. 7 is a full view showing the thrust bumper of FIG. 3.

Thrust bumper 130 is located to the left of thrust runner 128 with respect to FIG. 3, and thrust bearing 126 is located to the tight of thrust runner 128. FIGS. 5 and 6 show more details of thrust bearing 126; and FIGS. 7 and 8 show more details of thrust bumper 130. As shown in FIGS. 7 and 8, thrust bumper 130 is comprised essentially of an annular housing 152 and bumper shoes 154, 156, 158, 160, and 162. These shoes 154–162 are fixed, and preferably, are made of tungsten carbide. Each shoe 154–162 has an annular thrust bumper shock mount 164, 166, 168, 170, and 172, respectively. An alignment pin 174, 176, 178, 180, and 182 for each shoe 154–162, respectively, locates each shoe relative to its respective shock mount 164–172 for its mounting therein. Shoes 154–162 are retained in annular housing 152 by a retainer ring 184 located inwardly of annular housing 152 near its inner diameter and a flange 186 of annular housing 152 located outwardly thereof. The thrust bumper shock mounts 164–172, preferably, are made of a resilient material, such as rubber to provide some self-equalizing capability and to limit the shock load transmitted through bumper shoes 154–162.

Referring again to FIG. 3, thrust bumper 130 is shouldered against stationary axle 18 by way of an annular shim 188 which is in the form of a disk and which abuts a shoulder 189 of axle 18 and main journal sleeve 48 of journal cartridge 44 of radial bearing assembly 40. As can be seen in FIG. 3, there are slight clearances between shim 188 and axle 18. Rotation between thrust bumper 130 and axle 18 is prevented by an alignment pin 192 which is securely mounted in axle 18 and which extends into a cutout section 194 of an annular housing 152 of thrust bumper assembly 130.

A discussion of thrust bearing 126 will now be given with reference to FIGS. 3, 5, and 6 which, as stated hereinabove, is stationarily fixed to axle 18, the details of which will be discussed hereinbelow.

Thrust bearing 126 is comprised mainly of an annular housing 191 and several spaced-apart arcuately-shaped bearing shoes, three of which are shown particularly in FIG. 5 at numerals 194a, 196a, and 198a mounted around annular housing 191. Even though not shown in FIG. 5, additional bearing shoes are provided and spaced around annular housing 191 to form a circle similarly to those shown in FIG. 7 for thrust bumper 130. The bearing shoes of thrust bearing 126 are supported in annular housing 191 by way of several bearing links 193, 195, 196, 197, 199, 201, 203, 205, 207, and 209 which overlap and interconnect to form a circle within annular housing 191.

As can be seen in FIG. 6, links 195 and 197 overlap and are interconnected by pin 195a, and links 203 and 205 overlap and are interconnected by pin 203a. Referring to FIG. 6, securement of links 195 and 197 is by way of an integral pivot pin 211 and 213, respectively, which are received in bearing shoe 194a and annular housing 191, and fixedly secured thereto. A similar construction and interrelationship exists for the several additional links forming the circle of FIG. 5.

As shown in FIG. 6, the several bearing shoes and links of thrust bearing 126 are held in place in housing 191 by retainer ring 202 disposed inwardly of housing 191 and flange 204 of annular housing 191 located outwardly thereof. Retainer ring 202 is held in place prior to its assembly around axle 18 by a locking compound applied to the several neighboring components of thrust bearing 126. The bearing shoes and the links of thrust bearing 126 is of the Kingsbury-type bearing which is well-known in the art and which is self-equalizing.

As best seen in FIG. 3, when assembled, thrust bearing 126 is shouldered against an annular shim 206 which, in turn, is shouldered against annular housing 152 of thrust bumper 130. A slight radial clearance exists between shim 206 and axle 18. Rotation between thrust bearing 126 and axle 18 is prevented by alignment pin 208 which is securely fixed in axle 18 and which extends into a cutout section 210 of annular housing 191 of thrust bearing 126.

Still referring to FIG. 3, and particularly to the right thereof, there is shown a lock-nut 212 mounted onto axle 18. This lock-nut 212 retains thrust bearing 126 and thrust bumper 130 on axle 18 and retains the thrust bearing assembly 42 and the radial bearing assembly 44 in position on axle 18.

To the right of lock-nut 212 of FIG. 3, is a removable cover 214 which is aligned in axle 18 by pin 216 and securely fixed to axle 18 by bolt 219. Removable cover 214 has a stepped inwardly end portion 218 which interconnects with a stepped portion of retainer ring 184 of thrust runner 128, as shown in the upper and lower right hand portions of FIG. 3.

The several bearing surfaces of the thrust bearing 126, thrust runner 128 and thrust bumper 130 are made of a hard material, such as tungsten carbide, and the bearing shoes 154–162 of thrust bumper 130 are backed by a resilient material for the shock mounts 164–172, to restrict or limit the shock loads in an axial direction relative to propeller 22. Similarly, the bearing surfaces of journal cartridge 44 and bearing cartridge 46 of radial bearing assembly 40 are made of a hard material, such as tungsten carbide and are backed up by a resilient material of inner sleeves 50 and 52 of journal cartridge 44.

Referring again to FIGS. 2 and 3, and particularly to the left thereof, hub 24 is spaced away from vane hub 220 even though not clearly shown in the figures. Both hub 24 and vane hub 220 have spaced apart crenelated portions which interconnect to form a circuitous path. This allows sea water to enter the radial bearing assembly 40 and to flow from left to right of propeller unit 10 of FIG. 2 in order to cool and to lubricate the bearing surfaces in a manner well-known in the art. The sea water enters the clearances between the shaft hub 24 and vane hub 220 and exits in the clearances between the thrust runner 128 and removable cover 214.

This type of construction for a radial bearing assembly 40 and thrust bearing assembly 42 for the integral motor propulsor unit 10 for a water vehicle allows the bearing materials to withstand high impact shock loads. The degree to which the bearing materials of unit 10 can withstand the impact loads is determined by the degree of stiffness or resiliency of backing members 50, 52, and 164–172 of bearing assemblies 40 and 42. This stiffness or resiliency is such as to maintain the position of the rotating machinery under the "normal" bearing operating loads, but compliant enough to allow the bearings to be displaced under the high impact shock loads, and to transfer a majority of the shock loads to shock snubber locations, which are those areas located between the walls of the stator 28 and the rotor 32 of unit 10. These shock snubber locations are indicated in FIG. 2 by the circles designated as FIGS. 9 and 10.

Figure 9:
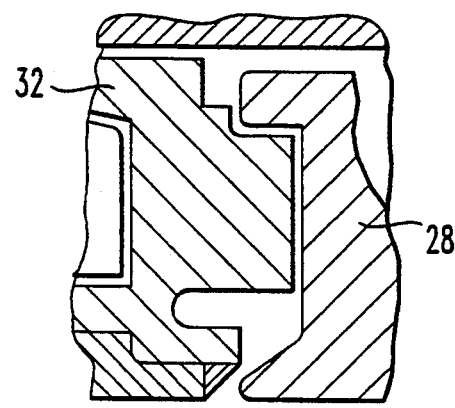
FIG. 9 is an enlarged view of the circled area labeled "FIG. 9" in FIG. 2 illustrating the details of the cooperating crenelated portions of the stator and the rotor.
Figure 10:
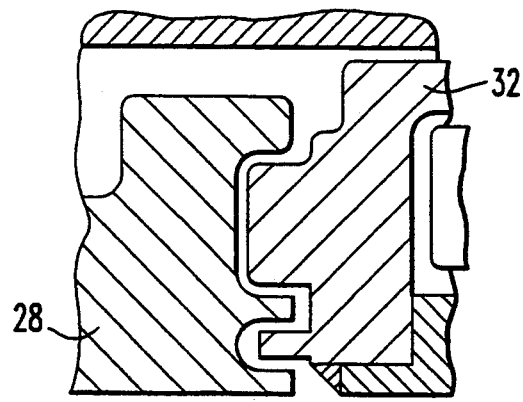
FIG. 10 is an enlarged view of the circled area labeled "FIG. 10" in FIG. 2 illustrating the details of the cooperating crenelated portions of the stator and the rotor.

As can be seen in the enlarged views of FIGS. 9 and 10, rotor 28 and stator 32 have crenelated portions which form a labyrinth therebetween. The dimension of the several clearances between the crenelated portions are less than the dimension of the gap or clearance between the rotor 28 and stator 32 along their longitudinal walls 222 and 224 indicated in the lower portion of FIG. 2, where rotor 28 nests within stator 32. These clearances formed by the crenelated portions of rotor 28 and stator 32 prevent sea water debris from entering therebetween, and as stated hereinabove, allows the rotor 28 to be displaced within stator 32 upon impact loads which are taken up by the shock snubber locations instead of being transferred directly into the rotor 28.

As an example, during a shock load upon the rotor assembly, the backing material of backing members 50, 52 of radial bearing assembly 40 of FIG. 3 will deflect in a radial direction and compress an amount about equal to the dimension of the radial clearances between rotor member 28 and stator member 32 of FIG. 10 in order for the impact loads to be transferred to the snubber locations of FIGS. 9 and 10 before they can be transferred to the gap between longitudinal walls 222 and 224 of rotor 28 and stator 32, respectively. As stated hereinabove, the radial clearances in the snubber locations of rotor 28 and stator 32 of FIGS. 9 and 10 are less, say for example 0.05 inches, compared to the clearance or gap between longitudinal walls 222 and 224 of rotor 28 and stator 32, which may be, for example, 0.09 inches.

During the same shock load, the backing material of backing members 164, 166, 168, 170, and 172 of thrust bearing assembly 42 will deflect in an axial direction and compress an amount about equal to the dimension of the axial clearances between members 28 and 32 of FIGS. 9 and 10 in order for the impact loads to be transferred to the snubber locations of FIGS. 9 and 10. In this example, the shock load transmitted through radial bearing assembly 40 is essentially limited to the force required to deflect the components of radial bearing assembly 42 against a backup stiffness for backing members 50 and 52 of about $3.5 \times 10^6$ psi, for instance, and the shock load transmitted through thrust bearing assembly 42 is essentially limited to the force required to deflect the components of the thrust bearing assembly 42 against a backup stiffness for backing members 164, 168, 170, and 172 of about $3.5-4.0 \times 10^6$ psi.

Whereas particular embodiments of the invention have been described above for purposes of illustration, it will be appreciated by those skilled in the art that numerous variations of the details may be made without departing from the invention as described in the appended claims.

It is to be appreciated that the bearing assembly of the invention can easily be used in any type of device and is not limited to an integral motor/propeller unit for a submersible seawater vehicle.

In accordance with the provisions of the patent statutes, we have explained the principles and operation of our invention and have illustrated and described what we consider to be the best embodiments thereof.

What is claimed is:

1. A submersible integral motor propeller unit, comprising:

nozzle means having a water inlet and a water outlet, propeller means having a rotating hub assembly mounted around a stationary axle assembly and within said nozzle means, an electric motor for driving said propeller means including a rotor means associated with said rotating hub assembly and mounted around the periphery of said propeller means, and a stator means associated with said stationary axle assembly and mounted within said nozzle means and spaced away from but magnetically coupled to said rotor means, bearing means associated with said rotating hub assembly and said stationary axle assembly and having at least two bearing components with bearing surfaces, said bearing surfaces being made of a relatively hard material for increasing the operating life of said bearing means, and backing means associated with at least one of said bearing components and being made of a resilient material characterized as being stiff enough to cooperate with said bearing means of said rotating hub assembly and said stationary axle assembly to control and maintain the centering of said rotating hub assembly relative to said stationary axle assembly under normal operating loads and being compliant enough to allow said rotating hub assembly to be displaced under high impact shock loadings and to transfer most of said high impact loads to snubber locations of said stator means and said rotor means.

2. A unit of claim 1, wherein said bearing means consists of a thrust bearing assembly and a radial bearing assembly.

3. A unit of claim 1, wherein said hard material of said bearing surface of said two bearing components is tungsten carbide.

4. A unit of claim 1, wherein said hard material of said bearing surface of said two bearing members is selected from the group of silicon carbide or other ceramic material.

5. A unit of claim 1, wherein said hard material of said bearing surface of said two bearing members is monolithic tungsten carbide, containing a nickel binder.

6. A unit of claim 1, wherein said resilient material of said backing means is rubber.

7. A unit of claim 1, wherein said resilient material of said backing means is selected from the group of neoprene, nitrile, or other seawater compatible rubber.

8. A unit of claim 1, wherein said bearing means includes means for circulating ambient water around said bearing surface of said bearing components to lubricate and cool said bearing means.

9. A unit of claim 1, wherein said snubber locations of said rotor means and said stator means have cooperative crenelated portions which prevent debris from entering the gap formed between said rotor means and said stator means.

10. A unit of claim 9, wherein said cooperative crenelated portions consists of clearances, and wherein the dimension of said clearances of said crenelated portions are relatively less than the dimension of said gap formed between said stator means and said rotor means, whereby said shock loads imposed on said rotor means by-pass said stator means and are transferred to said crenelated portions.

* * * * *